2 Sheets—Sheet 1.

J. URMY.
Car-Track Clearer.

No. 18,615. Patented Nov. 10, 1857.

J. URMY.
Car-Track Clearer.

No. 18,615.

2 Sheets—Sheet 2.

Patented Nov. 10, 1857.

UNITED STATES PATENT OFFICE.

JESSE URMY, OF WILMINGTON, DELAWARE.

REVOLVING SNOW-EXCAVATOR FOR RAILROADS.

Specification of Letters Patent No. 18,615, dated November 10, 1857.

*To all whom it may concern:*

Be it known that I, JESSE URMY, of Wilmington, in the county of Newcastle and State of Delaware, have invented a new and useful Improvement in Snow-Excavators and Track-Cleaners; and I do hereby declare that the following is a full, clear, and exact description of the same, reference being had to the accompanying drawings, forming part of this specification, in which—

Figure 1:
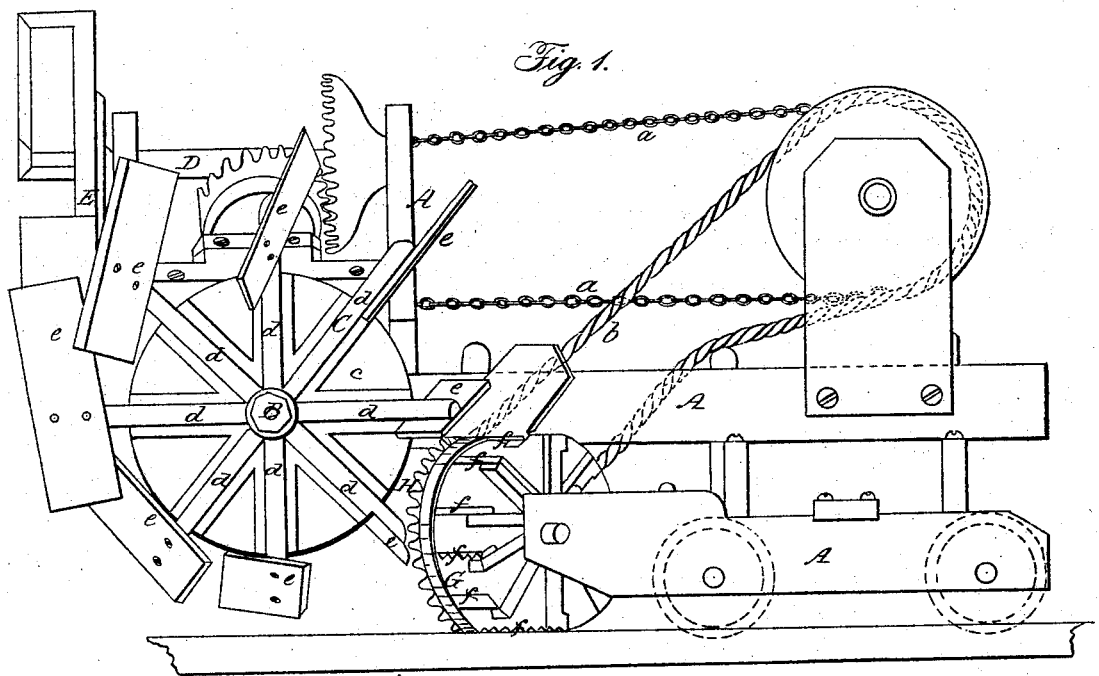
Figure 2:
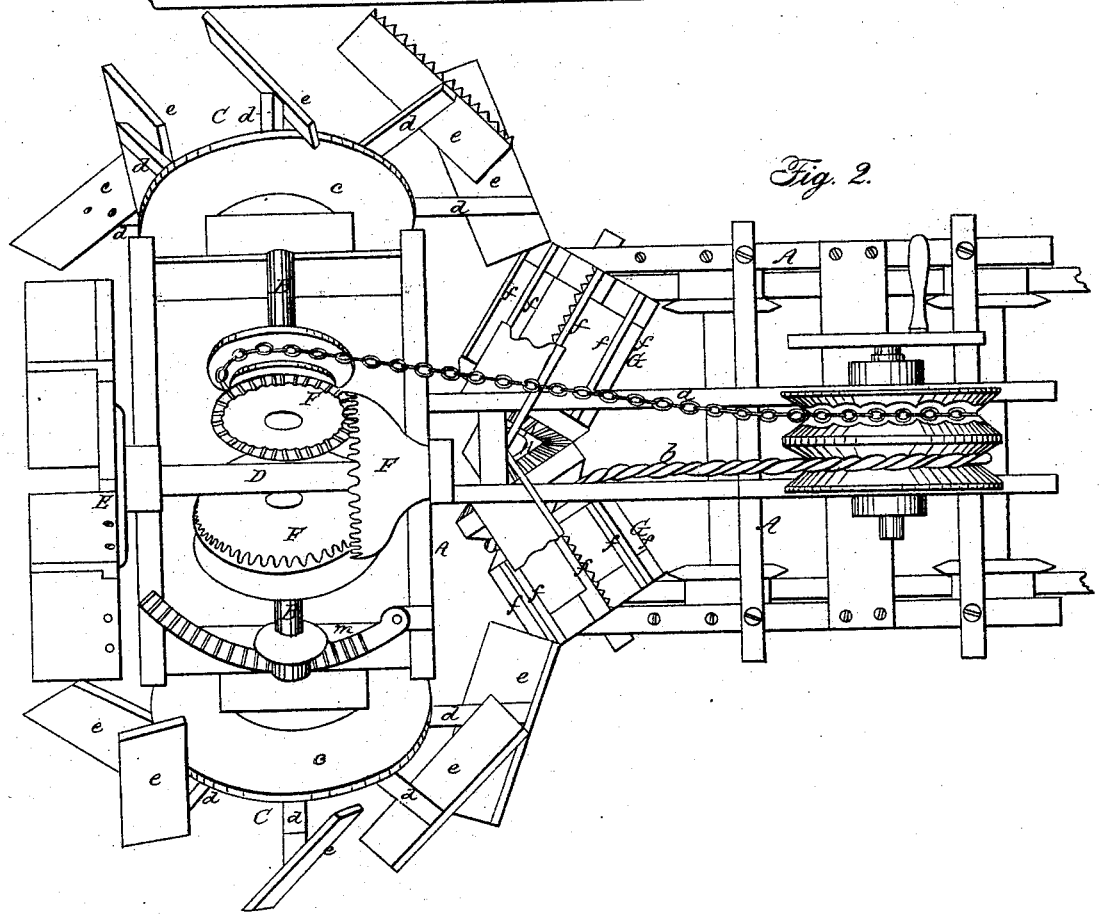
Figure 3:
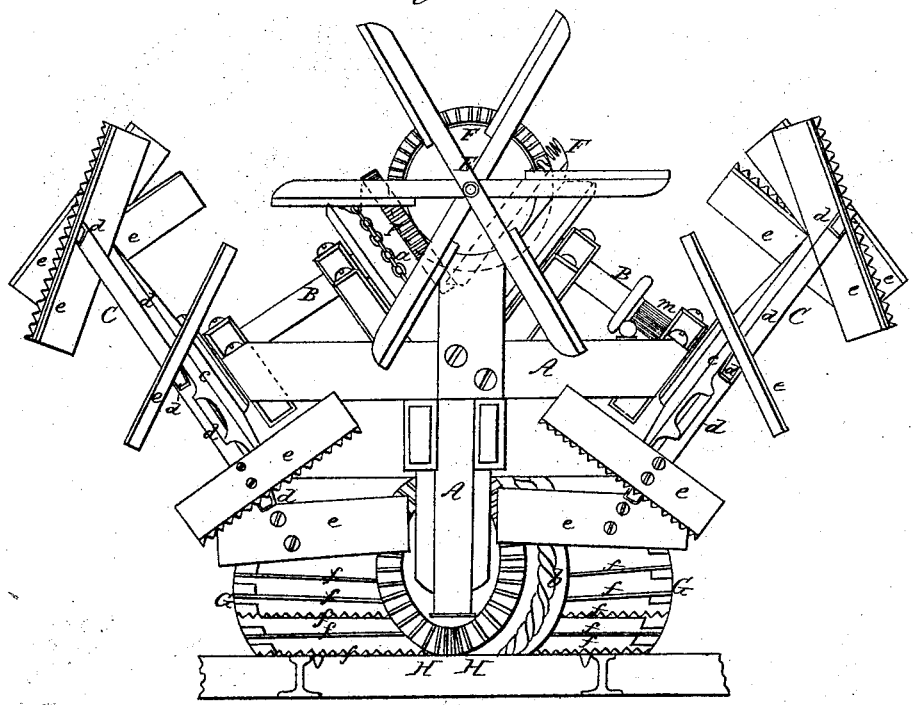
Figure 4:
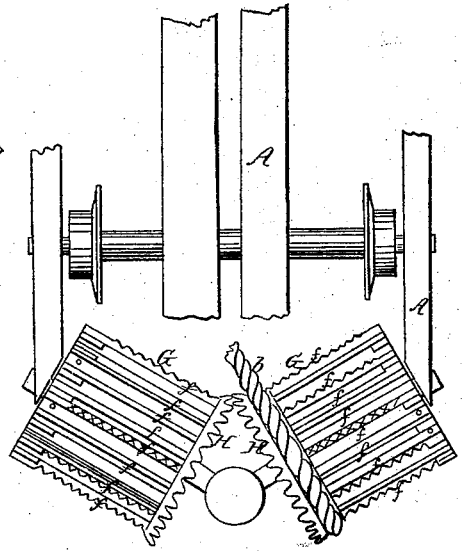

Figure 1 is a side elevation; Fig. 2, a plan; Fig. 3, an end elevation; and Figs. 4 and 5 detail views of my snow excavator and track cleaner.

Similar letters of reference in each of the several figures indicate corresponding parts.

My invention is designed for use in heavy snow drifts for cleaning snow from rail road tracks.

The nature of my invention consists 1st, in the employment of two revolving paddle wheels on a truck frame, when the axles of said wheels are set at an angle to a horizontal plane, and the arms of the same at right angles to the axles, and the edged paddles or toothed plates stand diagonal to the axis of the wheel and oblique to a line at right angles to the arms. Whereby as the truck moves along the snow is swept or cleaned off the track and thrown to one side in a rapid and continuous manner.

My invention consists second in the employment, for operation in connection with the above, of a paddle wheel in front of the truck frame, for the purpose of clearing away the snow on the center of the track and thus avoiding resistance and keeping the mechanism from getting clogged.

To enable others skilled in the art to make and use my invention I will proceed to describe its construction and operation.

A is a truck frame suitably constructed to receive and sustain the working mechanism.

B, B, are the axles of the side clearing wheels C, C. These axles set at an angle of about 45° to a horizontal plane.

D, is the axle of the front clearing wheel E. This axle lies horizontal. On each of these axles is a bevel gear wheel F. The gear wheel of the axle D, meshes into those the axles B, B, as shown, and consequently all three axles move together by means of a single chain $a$, leading from a pulley on a shaft of the truck frame as shown, or otherwise.

Figure 5:
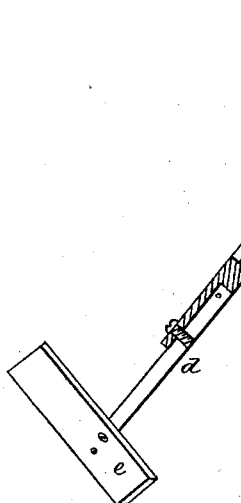

The side clearing wheels C, C, have metallic hubs $c$, which have a number of open slots $c'$ on their inner faces as in Fig. 5 in which the arms $d$, $d$, $d$, are fitted and pivoted as shown in Fig. 5. They being pivoted so that they may be moved toward the center of the truck frame in passing through bridges and narrow channels. Instead of thus pivoting the arms they may be arranged as shown in Figs. 1, 2 and 3 and curved rack railways $m$, provided, on which to run the wheels round out of the way in passing through bridges or narrow channels.

The clearing plates $e$, $e$, $e$, $e$, $e$, of the wheels C, are arranged on the outer extremity of the arms so as to stand diagonal to the axles B, B, and oblique to a line at right-angles to the arms or in such position that when moving over the track their edge shall be horizontal therewith and at the same time shall stand diagonally, more or less, across the same. By thus arranging the plates $e$, $e$, $e$, $e$, $e$, they completely sweep or clear the track and throw the snow to either side of the same.

The blades of the central clearing and guard wheel are placed straight on the arms and as the wheel revolves in the path of a vertical circle they clear away the snow from the front of the truck and throw it to one side of the track.

This snow excavator and track clearer may be used in front of a locomotive, or otherwise. If used in front of a locomotive its operating mechanism may be set in motion by means of a belt leading from a pulley on the axle of the propelling wheels, or otherwise as found most convenient or suitable; and if moved by horse power it may have a tongue attached to its rear end.

That part of the truck frame which supports the central or dividing wheel E, is to be so attached to the part which has the ice cylinders and propelling wheels applied to it that it can be raised and lowered independent of the same as may be required to suit the necessity of the case.

Having described the construction and operation of my machine what I claim as my improvement and desire to secure by Letters Patent is—

1. The obliquely set, side paddle wheels (C, C,) whose axles lie in a plane, vertical to, and at right angles with the track and diverge downward from a point over the center of the track and whose arms, radiating in a plane at right angles with said axes, have upon their extremities, edged or toothed paddles (e, e,) so arranged as that each one shall, when at the lowest point of the plane in which it revolves, be in a horizontal plane and oblique to the rail of the track, substantially as and for the purposes herein set forth.

2. The central paddle wheel (E) revolving in a vertical plane at right angles with the track, in combination with the obliquely set side paddle wheels (c, c,) the whole arranged substantially as and for the purpose herein described.

JESSE URMY.

Witnesses:
ABRAHAM STAATS,
SAML. BUZINE.